US011748558B2

(12) United States Patent
Tiwari et al.

(10) Patent No.: US 11,748,558 B2
(45) Date of Patent: Sep. 5, 2023

(54) MULTI-PERSONA SOCIAL AGENT

(71) Applicant: Disney Enterprises, Inc., Burbank, CA (US)

(72) Inventors: Sanchita Tiwari, Trumbull, CT (US); Xiuyang Yu, Unionville, CT (US); Brian Kazmierczak, Hamden, CT (US); Dirk Van Dall, Shelter Island, NY (US)

(73) Assignee: Disney Enterprises, Inc., Burbank, CA (US)

( * ) Notice: Subject to any disclaimer, the term of this patent is extended or adjusted under 35 U.S.C. 154(b) by 249 days.

(21) Appl. No.: 17/081,906

(22) Filed: Oct. 27, 2020

(65) Prior Publication Data

US 2022/0129627 A1  Apr. 28, 2022

(51) Int. Cl.

| | |
|---|---|
| *A63F 13/58* | (2014.01) |
| *G06F 40/20* | (2020.01) |
| *G06N 3/08* | (2023.01) |
| *G06V 40/16* | (2022.01) |
| *G06N 3/045* | (2023.01) |
| *G10L 17/26* | (2013.01) |

(Continued)

(52) U.S. Cl.
CPC ............ *G06F 40/20* (2020.01); *G06N 3/045* (2023.01); *G06N 3/08* (2013.01); *G06V 40/174* (2022.01); *A63F 13/58* (2014.09); *G09B 7/00* (2013.01); *G10L 15/1822* (2013.01); *G10L 17/26* (2013.01)

(58) Field of Classification Search
CPC ....... A63F 13/58; G09B 7/00; G06F 17/3053; G10L 15/1822; G10L 17/26
See application file for complete search history.

(56) References Cited

U.S. PATENT DOCUMENTS

| | | | |
|---|---|---|---|
| 2002/0099499 A1* | 7/2002 | Takayama .......... | G01C 21/3647 701/400 |
| 2004/0038739 A1* | 2/2004 | Wanat ..................... | A63F 13/77 463/36 |

(Continued)

OTHER PUBLICATIONS

"A Persona-Based Neural Conversation Model" by Li et al. (Stanford University, Dept. of Computer Science 2016).

(Continued)

*Primary Examiner* — Feng-Tzer Tzeng
(74) *Attorney, Agent, or Firm* — Farjami & Farjami LLP (57) ABSTRACT

A system providing a multi-persona social agent includes a computing platform having a hardware processor, a system memory storing a software code, and multiple neural network (NN) based predictive models accessible by the software code. The hardware processor executes the software code to receive input data corresponding to an interaction with a user, determine a generic expression for use in the interaction, and identify one of the character personas as a persona to be assumed by the multi-persona social agent. The software code also generates, using the generic expression and one of the NN based predictive models corresponding to the persona to be assumed by the multi-persona social agent, a sentiment driven personified response for the interaction with the user based on a vocabulary, phrases, and one or more syntax rules idiosyncratic to the persona to be assumed, and renders the sentiment driven personified response using the multi-persona social agent.

17 Claims, 7 Drawing Sheets

(51) Int. Cl.
*G10L 15/18* (2013.01)
*G09B 7/00* (2006.01)

(56) References Cited

U.S. PATENT DOCUMENTS

2006/0122834 A1* 6/2006 Bennett ............... G10L 15/1822
704/E15.047
2006/0235696 A1* 10/2006 Bennett ................ G06F 40/289
704/E15.04
2015/0324361 A1* 11/2015 Glass ................ G06F 16/24578
707/748

OTHER PUBLICATIONS

"A Personality-based Framework for Utterance Generation in Dialogue Applications" by François Mairesse and Marilyn Walker. (AAAI 2008).
"All the World's a Stage: Learning Character Models from Film" by Grace I. Lin and Marilyn A. Walker. (AAAI 2011).
"CTRL: A Conditional Transformer Language Model for Controllable Generation" by Keskar et al. (Salesforce Research 2019).
"Learning Continuous Phrase Representations for Translation Modeling" by Gao et al. (Microsoft Research 2019).
"Neural Machine Translation B Y Jointly Learning to Align and Translate" by Bahdanau et al. (ICLR 2015).
"Sketch-Fill-A-R: A Persona-Grounded Chit-Chat Generation Framework" by Shum et al. (ACL 2020).

\* cited by examiner

US 11,748,558 B2

MULTI-PERSONA SOCIAL AGENT

BACKGROUND

Advances in artificial intelligence have led to the development of a variety of devices providing one of several dialogue-based interfaces, such as GOOGLE HOME™, AMAZON ALEXA™, and others. However, the dialogue interfaces provided by these and similar devices each typically project a single synthesized persona that tends to lack character and naturalness. Moreover, these devices and the dialog interfaces provided by the conventional art are typically transactional, and indicate to a user that they are listening for a communication from the user by responding to an affirmative request by the user.

In contrast to conventional transactional device interactions, natural communications between human beings are more nuanced and varied, and include the use of non-verbal, as well as verbal expressions, some of which may be idiosyncratic to a particular individual's personality. Consequently, there is a need in the art for an interactive social agent that is capable of assuming a variety of different personas each having unique personality characteristics and patterns of expression.

DETAILED DESCRIPTION

The following description contains specific information pertaining to implementations in the present disclosure. One skilled in the art will recognize that the present disclosure may be implemented in a manner different from that specifically discussed herein. The drawings in the present application and their accompanying detailed description are directed to merely exemplary implementations. Unless noted otherwise, like or corresponding elements among the figures may be indicated by like or corresponding reference numerals.

As stated above, advances in artificial intelligence have led to the development of a variety of devices providing one of several dialogue-based interfaces. However, the dialogue interfaces provided by conventional devices tend to lack character and naturalness, at least in part because they are transactional. By contrast, natural communications between human beings are more nuanced and varied, and include the use of non-verbal, as well as verbal expressions, some of which may be idiosyncratic to a particular individual's personality.

The present application is directed to automated systems and methods that address and overcome the deficiencies in the conventional art. The solutions disclosed in the present application advantageously enable the automated determination of naturalistic expressions for use by a multi-persona social agent in communicating with a user, based on learned speech, sentiment or mood, and personality characteristics of the particular character persona being assumed by the multi-persona social agent. Those naturalistic expressions based on the learned speech, sentiment or mood, and personality characteristics of a particular character persona are hereinafter referred to as "sentiment driven personified responses."

It is noted that, as used in the present application, the feature "character persona" may refer to the projected personality of a fictional character, virtual character, historical person, or contemporary actor or other celebrity. That is to say, a character persona may display one or more of the speech patterns, word choices, non-verbal expressions and personality traits such as gregariousness, shyness, or irascibility, for example, that are typical of or idiosyncratic to the character or person to which the character persona corresponds. It is further noted that, as defined in the present application, the term "non-verbal expression" may refer to vocalizations that are not language based, i.e., non-verbal vocalizations, as well as to physical gestures and postures. Examples of non-verbal vocalizations may include a sigh, a murmur of agreement or disagreement, or a giggle, to name a few. By contrast to the emphasis on non-verbal as well as verbal expression in the present application, conventional state-of-the-art systems do not offer a generalized way to map between sets of non-verbal expressions.

It is also noted, as used in the present application, the terms "automation," "automated," and "automating" refer to systems and processes that do not require human intervention. Although, in some implementations, a human editor may review the sentiment driven personified responses generated by the systems and using the methods described herein, that human involvement is optional. Thus, the methods described in the present application may be performed under the control of hardware processing components of the disclosed automated systems.

In addition, as used in the present application, the term "multi-persona social agent" refers to a non-human communicative entity rendered in hardware and software that is designed for goal oriented expressive interaction with a human user. In some use cases, a multi-persona social agent may take the form of a goal oriented virtual character rendered on a display (i.e., multi-persona social agent 116a rendered on display 108, in FIG. 1) and appearing to watch and listen to a user in order to initiate a conversation with the user and to respond to a communicative user input. In other use cases, a multi-persona social agent may take the form of a goal oriented machine (i.e., multi-persona social agent 116b, in FIG. 1), such as a robot for example, appearing to watch and listen to the user in order to initiate a conversation with the user and to respond to a communicative user input. Alternatively, a multi-persona social agent may be implemented as an automated voice response (AVR) system, or an interactive voice response (IVR) system, for example.

Moreover, as used in the present application, the term neural network (NN) refers to one or more machine learning engines implementing respective predictive models designed to progressively improve their performance of a specific task. As known in the art, a "machine learning model" may refer to a mathematical model for making future predictions based on patterns learned from samples of data or "training data." Various learning algorithms can be used to map correlations between input data and output data. These correlations form the mathematical model that can be used to make future predictions on new input data. Moreover, a "deep neural network," in the context of deep learning, may refer to an NN that utilizes multiple hidden layers between input and output layers, which may allow for learning based on features not explicitly defined in raw data. As used in the present application, any feature identified as an NN refers to a deep neural network. In various implementations, NNs may be trained as classifiers and may be utilized to perform image processing or natural-language processing.

Figure 1:
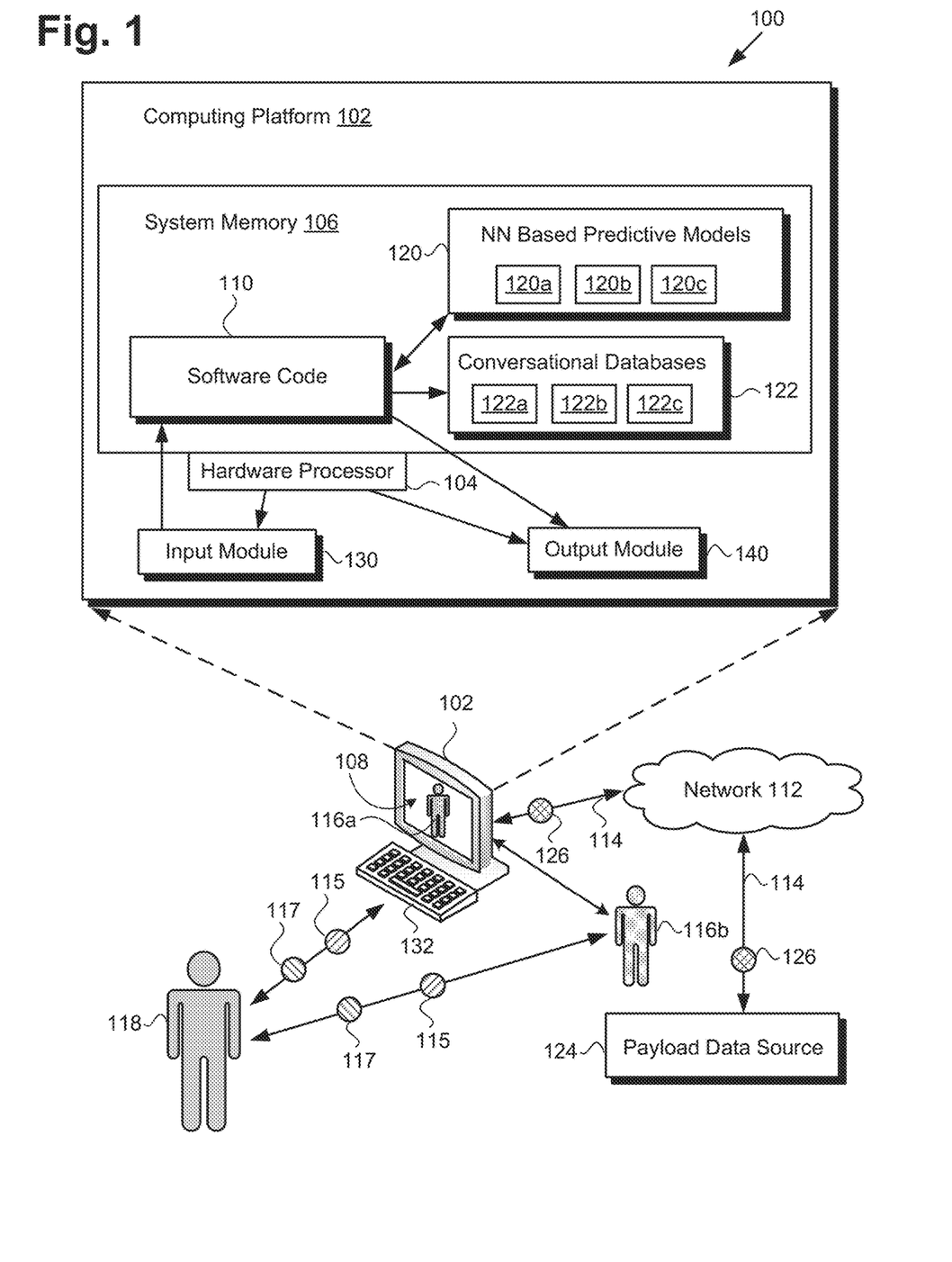
FIG. 1 shows a diagram of a system providing a multi-persona social agent, according to one exemplary implementation.

FIG. 1 shows a diagram of system 100 providing a multi-persona social agent, according to one exemplary implementation. As shown in FIG. 1, system 100 includes computing platform 102 having hardware processor 104, input module 130 including input device 132, output module 140 including display 108, and system memory 106 implemented as a non-transitory storage device. According to the present exemplary implementation, system memory 106 stores software code 110, NN based predictive models 120, and persona specific conversational databases 122. In addition, FIG. 1 shows multi-persona social agents 116a and 116b instantiated by software code 110 using NN based predictive models 120, when executed by hardware processor 104.

As further shown in FIG. 1, system 100 is implemented within a use environment including communication network 112 providing network communication links 114, payload data source 124 providing payload data 126, and user 118 in communication with multi-persona social agent 116a or 116b. Also shown in FIG. 1 are individual NN based predictive models 120a, 120b, and 120c (hereinafter "NN based predictive models 120a-120c") included among NN based predictive models 120, and individual persona specific conversational databases 122a, 122b, and 122c (hereinafter "persona specific conversational databases 122a-122c"), as well as input data 115 and other input data 117 received by system 100 from user 118.

It is noted that each of NN based predictive models 120a-120c is trained to predict the interactive behavior of a respective one of multiple different character personas that may be selectively assumed by multi-persona social agents 116a or 116b. It is further noted that each of persona specific conversational databases 122a-122c also corresponds to a respective one of the multiple different character personas that may be selectively assumed by multi-persona social agents 116a or 116b, and may include a vocabulary, phrases, and syntax rules characteristic of expressions used by its corresponding character persona. Moreover, although the exemplary implementation shown in FIG. 1 depicts three NN based predictive models 120a-120c and three persona specific conversational databases 122a-122c, that representation is provided merely for conceptual clarity. In other implementations, NN based predictive models 120 may include more than three predictive models, while persona specific conversational databases 122 may include more than three persona specific conversational databases. In one implementation, for example, NN based predictive model 120a and persona specific conversational database 122a may correspond to a first character persona, NN based predictive model 120b and persona specific conversational database 122b may correspond to a second character persona different from the first character persona, NN based predictive model 120c and persona specific conversational database 122c may correspond to a third character persona different from the first and second character personas, and so forth.

Although the present application may refer to one or more of software code 110, NN based predictive models 120, and persona specific conversational databases 122 as being stored in system memory 106 for conceptual clarity, more generally, system memory 106 may take the form of any computer-readable non-transitory storage medium. The expression "computer-readable non-transitory storage medium," as used in the present application, refers to any medium, excluding a carrier wave or other transitory signal that provides instructions to hardware processor 104 of computing platform 102. Thus, a computer-readable non-transitory medium may correspond to various types of media, such as volatile media and non-volatile media, for example. Volatile media may include dynamic memory, such as dynamic random access memory (dynamic RAM), while non-volatile memory may include optical, magnetic, or electrostatic storage devices. Common forms of computer-readable non-transitory media include, for example, optical discs, RAM, programmable read-only memory (PROM), erasable PROM (EPROM), and FLASH memory.

It is further noted that although FIG. 1 depicts software code 110, NN based predictive models 120, and persona specific conversational databases 122 as being co-located in system memory 106, that representation is also merely provided as an aid to conceptual clarity. More generally, system 100 may include one or more computing platforms 102, such as computer servers for example, which may be co-located, or may form an interactively linked but distributed system, such as a cloud-based system, for instance. As a result, hardware processor 104 and system memory 106 may correspond to distributed processor and memory resources within system 100.

In some implementations, computing platform 102 may correspond to one or more web servers, accessible over a packet-switched network such as the Internet, for example. Alternatively, computing platform 102 may correspond to one or more computer servers supporting a private wide area network (WAN), local area network (LAN), or included in another type of limited distribution or private network. Consequently, in some implementations, software code 110, NN based predictive models 120, and persona specific conversational databases 122 may be stored remotely from one another on the distributed memory resources of system 100.

Alternatively, when implemented as a personal computing device, computing platform 102 may take the form of a desktop computer, as shown in FIG. 1, or any other suitable mobile or stationary computing system that implements data processing capabilities sufficient to support connections to communication network 112, provide a user interface, and implement the functionality ascribed to computing platform 102 herein. For example, in other implementations, computing platform 102 may take the form of a laptop computer, tablet computer, or smartphone, for example, providing display 108. Display 108 may take the form of a liquid crystal display (LCD), a light-emitting diode (LED) display, an organic light-emitting diode (OLED) display, a quantum dot (QD) display, or a display using any other suitable display technology that performs a physical transformation of signals to light.

Whether computing platform 102 takes the form of one or more network servers or a personal computing device, in some implementations, NN based predictive models 120, and persona specific conversational databases 122 may be accessible to software code 110 via communication network 112, but may be stored remotely from software code 110. It is also noted that although FIG. 1 shows input module 130 as including input device 132, output module 140 as including display 108, and both input module 130 and output module 140 as residing on computing platform 102, those representations are merely exemplary as well. In other implementations including an all-audio interface, for example, input module 130 may be implemented as a microphone, while output module 140 may take the form of a speaker. Moreover, in implementations in which multi-persona social agent 116b takes the form of a robot or other type of machine, input module 130 and output module 140 may be integrated with multi-persona social agent 116b rather than with computing platform 102. In other words, in some implementations, multi-persona social agent 116b may include input module 130 and output module 140.

Although FIG. 1 shows user 118 as a single user, that representation too is provided merely for conceptual clarity. More generally, user 118 may correspond to multiple users concurrently engaged in communication with one or both of multi-persona social agents 116a and 116b via system 100.

Figure 2A:
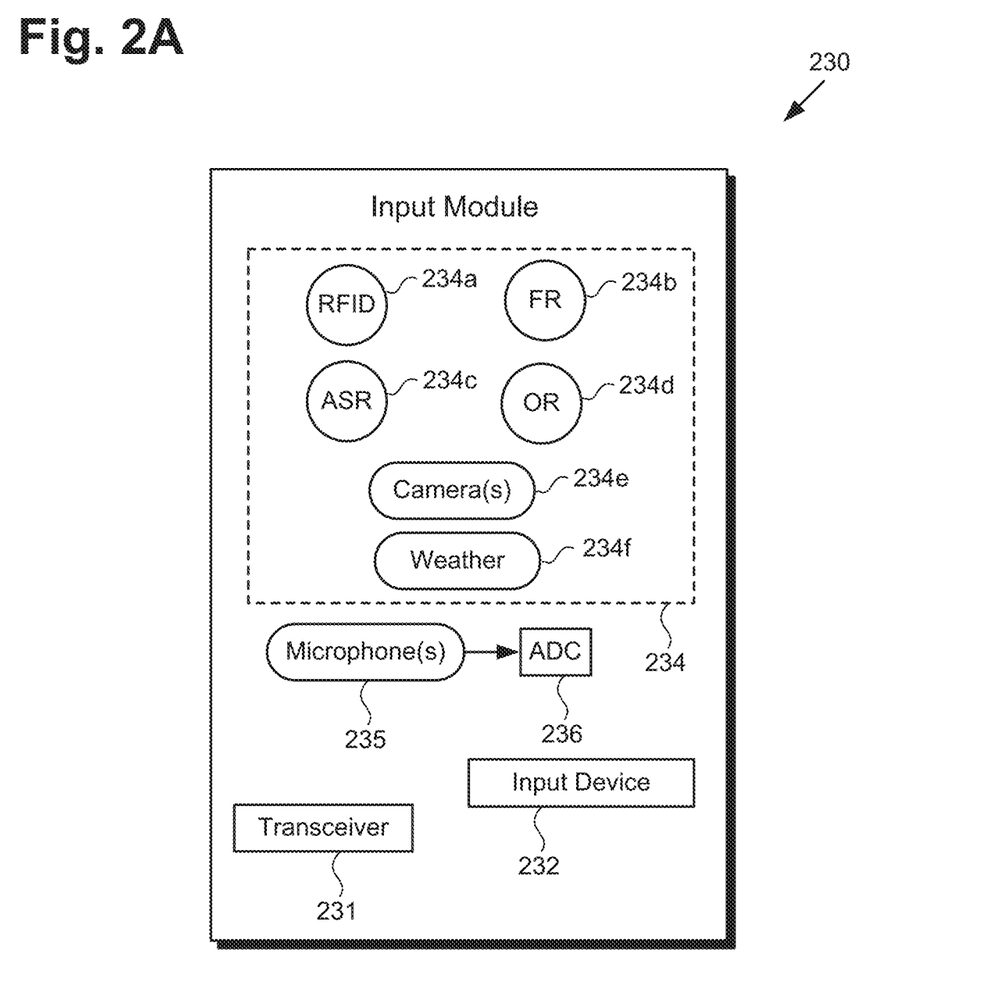
FIG. 2A shows a more detailed diagram of an input module suitable for use in the system of FIG. 1, according to one implementation.

FIG. 2A shows a more detailed diagram of input module 230 suitable for use in system 100, in FIG. 1, according to one implementation. As shown in FIG. 2A, input module 230 includes input device 232, multiple sensors 234, one or more microphones 235 (hereinafter "microphone(s) 235"), analog-to-digital converter (ADC) 236, and may include transceiver 231. As further shown in FIG. 2A, sensors 234 of input module 230 may include radio-frequency identification (RFID) sensor 234a, facial recognition (FR) sensor 234b, automatic speech recognition (ASR) sensor 234c, object recognition (OR) sensor 234d, one or more cameras 234e (hereinafter "camera(s) 234e"), and one or more weather sensor(s) 234f (hereinafter "weather sensor(s) 234f"). Input module 230 and input device 232 correspond respectively in general to input module 130 and input device 132, in FIG. 1. Thus, input module 130 and input device 132 may share any of the characteristics attributed to respective input module 230 and input device 232 by the present disclosure, and vice versa.

It is noted that the specific sensors shown to be included among sensors 234 of input module 130/230 are merely exemplary, and in other implementations, sensors 234 of input module 130/230 may include more, or fewer, sensors than RFID sensor 234a, FR sensor 234b, ASR sensor 234c, OR sensor 234d, camera(s) 234e, and weather sensor(s) 234f. Moreover, in other implementations, sensors 234 may include a sensor or sensors other than one or more of RFID sensor 234a, FR sensor 234b, ASR sensor 234c, OR sensor 234d, camera(s) 234e, and weather sensor(s) 234f. It is further noted that camera(s) 234e may include various types of cameras, such as red-green-blue (RGB) still image and video cameras, RGB-D cameras including a depth sensor, and infrared (IR) cameras, for example. It is also noted that weather sensor(s) 234f may include temperature sensors, humidity and precipitation sensors, and barometric pressure sensors, to name a few examples.

When included as a component of input module 130/230, transceiver 231 may be implemented as a wireless communication unit enabling multi-persona social agent 116b to obtain payload data 126 from payload data source 124 via communication network 112 and network communication links 114. For example, transceiver 231 may be implemented as a fourth generation (4G) wireless transceiver, or as a 5G wireless transceiver configured to satisfy the IMT-2020 requirements established by the International Telecommunication Union (ITU). Alternatively, or in addition, transceiver 231 may be configured to communicate via one or more of WiFi, Bluetooth, ZigBee, and 60 GHz wireless communications methods.

Figure 2B:
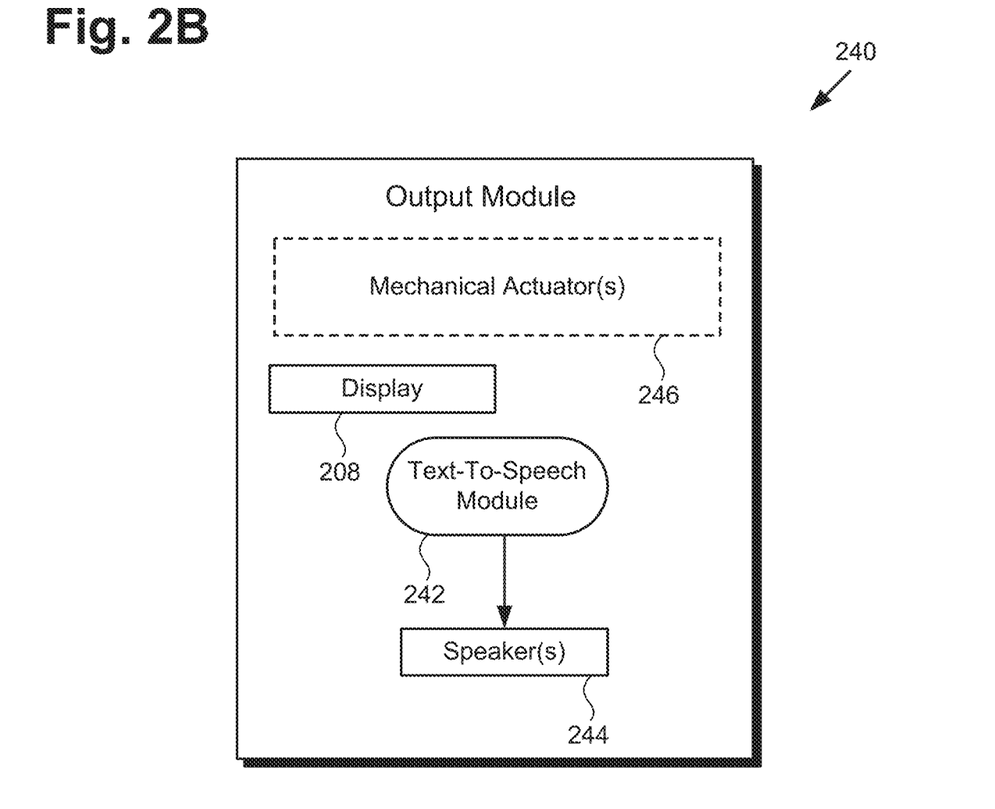
FIG. 2B shows a more detailed diagram of an output module suitable for use in the system of FIG. 1, according to one implementation.

FIG. 2B shows a more detailed diagram of output module 240 suitable for use in system 100, in FIG. 1, according to one implementation. As shown in FIG. 2B, output module 240 includes display 208, Text-To-Speech (TTS) module 242 and one or more audio speakers 244 (hereinafter "audio speaker(s) 244"). As further shown in FIG. 2B, in some implementations, output module 240 may include one or more mechanical actuators 246 (hereinafter "mechanical actuator(s) 246"). It is noted that, when included as a component or components of output module 240, mechanical actuator(s) 246 may be used to produce facial expressions by multi-persona social agent 116b, and to articulate one or more limbs or joints of multi-persona social agent 116b. Output module 240 and display 208 correspond respectively in general to output module 140 and display 108, in FIG. 1. Thus, output module 140 and display may share any of the characteristics attributed to respective output module 240 and display 208 by the present disclosure, and vice versa.

It is noted that the specific components shown to be included in output module 140/240 are merely exemplary, and in other implementations, output module 140/240 may include more, or fewer, components than display 108/208, TTS module 242, speaker(s) 244, and mechanical actuator(s) 246. Moreover, in other implementations, output module 140/240 may include a component or components other than one or more of display 108/208, TTS module 242, speaker(s) 244, and mechanical actuator(s) 246.

Figure 3:
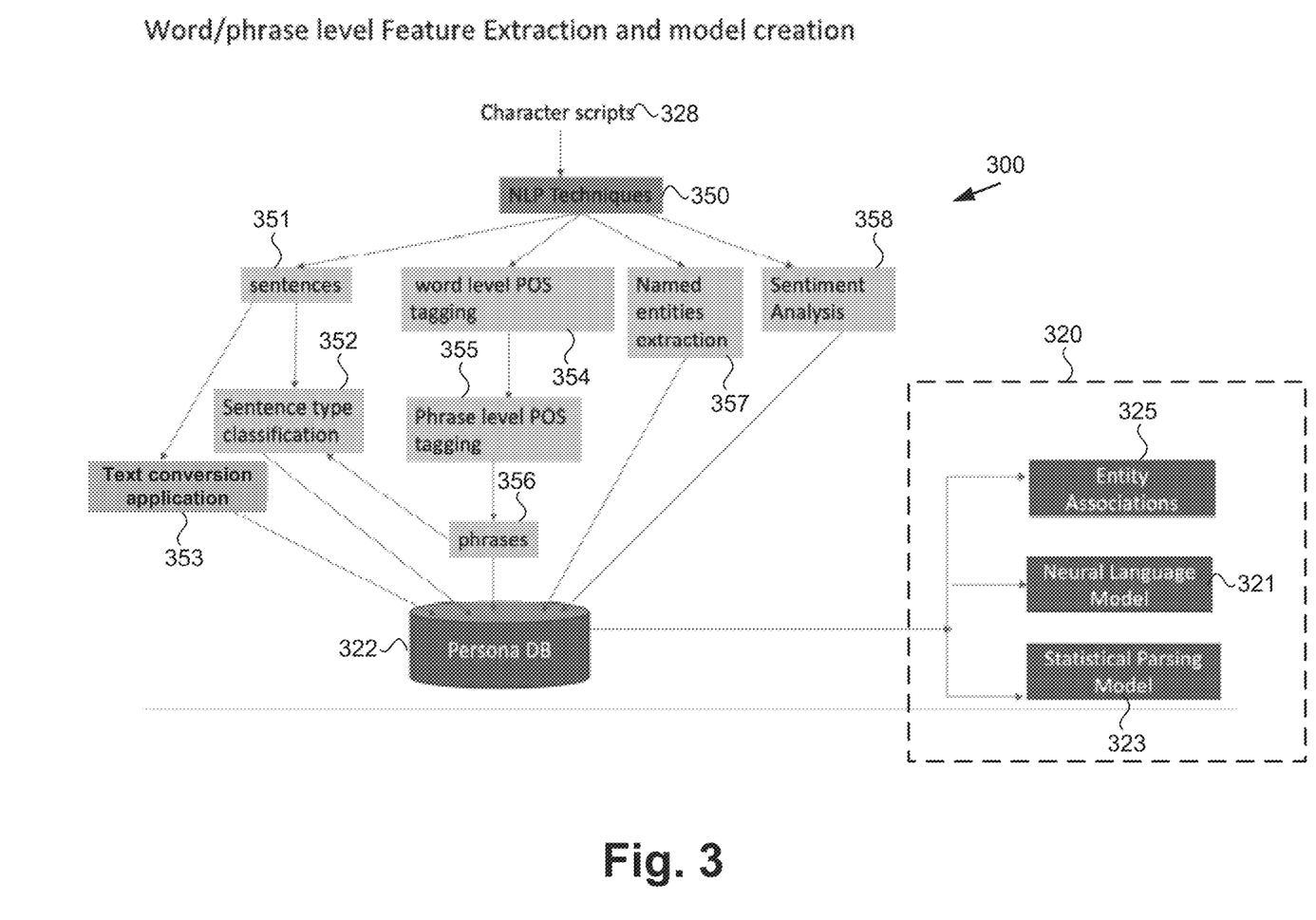
FIG. 3 is a diagram depicting generation of a persona specific conversational database, as well as its use to train a neural network based predictive model, according to one implementation.

FIG. 3 shows diagram 300 depicting generation of persona specific conversational database 322 (also hereinafter "Persona DB 322"), as well as use of Persona DB 322 to train NN based predictive model 320, according to one implementation. NN based predictive model 320 corresponds in general to any one of NN based predictive models 120, while Persona DB 322 corresponds in general to any one of persona specific conversational databases 122, in FIG. 1. That is to say, each of NN based predictive models 120 and persona specific conversational databases 122 may share any of the characteristics attributed to respective NN based predictive model 320 and Persona DB 322 by the present disclosure, and vice versa.

As shown by diagram 300, Persona DB 322 may be generated by applying natural language processing (NLP) techniques 350 to unstructured datasets in the form of character scripts 328. Character scripts 328 may include one or more of a movie script, a television script, and a video game script including interactions by a particular character persona, and describing language and non-verbal expressions specific to or idiosyncratic to that particular character persona.

NLP techniques 350 may be applied to unstructured datasets in the form of character scripts 328 in order to extract structured information from those unstructured datasets. That structured information can include phrases 356 (i.e., sub-sentence word strings) and named entities extraction 357 in which other named characters with whom the character persona interacts are identified, as well the nature of their interactions and relationships. Phrases 356 can be classified using word level parts-of-speech (POS) tagging 354 and phrase level POS tagging 355 as noun phrases, verb phrases, gerund phrases, infinitive phrases, appositive phrases, participial phrases, prepositional phrases, and absolute phrases, for example.

In addition NLP techniques 350 may be used to identify independent clauses (subject-verb-object) favored by the character persona corresponding to Persona DB 322, frequently used words and phrases based on word and phrase count, as well as to perform sentiment analysis 358 of the character persona. Sentences 351 may also be analyzed based at least in part on phrases 356 they contain, to perform sentence type classification 352, while sentence and phrase topic classification may be performed using latent semantic analysis, latent Dirichlet allocation, or a k-nearest neighbors algorithm, as known in the art. Sentence type classification 352 may group sentences uttered by the character persona into classes such as questions, commands, declarative sentences, and exclamatory sentences, for example. The sentence type may be utilized as one of the control parameters in determination of a generic expression or generation of a sentiment driven personified response for use by the character persona corresponding to Persona DB 322.

Text conversion application 353 is an embedding application that may be used in conjunction with sentences 351 to convert text strings into respective numerical vectors. As a specific but non-limiting example, text conversion application 353 may be implemented using an open source embedding algorithm, such as the word2vec algorithm, as known in the art. All of the above NLP processing techniques and resources can be used to extract, from unstructured datasets in the form of character scripts 328, structured data reflecting the linguistic behaviors of the character persona corresponding to Persona DB 322, as well as character traits of the character persona, such as openness, conscientiousness, extraversion, agreeableness, and emotional stability, for example.

As further shown in FIG. 3, NN based predictive model 320 may include neural language model 321, statistical parsing model 323, and entity associations 325. Neural language model 321 of NN based predictive model 320 may be trained using the structured data extracted from unstructured datasets in the form of character scripts 328 using NLP techniques 350, and stored in Persona DB 322. Neural Language model 321 is trained to predict the next word or phrase in sentence generation during an interaction by multi-persona social agent 116a or 116b, in FIG. 1, with a human user, such as user 118. In one implementation, neural language model 321 may be trained by a recurrent NN (RNN), such as a Long Short-Term Memory (LSTM) network, on Persona DB 322.

Using neural language model 321 to generate a new sentence is an iterative process. Such a process may include selecting a word based on a sequence of words and adding the selected word to the sequence. That step may be repeated until the length of the sequence reaches a predetermined length, or until an end of a sentence is reached. Neural language model 321 may assign probabilities to a sequence of words given some conditioning context(s):

$$P(w_k|s, w_1, \ldots w_{k-1})$$

Using the same process neural language model 321 may be trained on persona phrases from Persona DB 322:

$$P(p_k|s, p_1, \ldots, p_{k-1})$$

Weights are applied to word level and phrase level probabilities respectively when selecting the next word or phrase to prefer phrases more than single words, It could be a predefined and fine-tuned hyperparameter.

Statistical parsing model 323 may be trained on Persona DB 322 to identify the style of speaking adopted by the character persona corresponding to Persona DB 322. For example, statistical parsing model 323 may be used to identify the relative positions of parts of speech within a typical sentence spoken by the character persona, such as the typical locations of prepositional phrases, the location within a sentence in which another entity is identified in a sentence, and the relative locations and ordering of nouns, verbs, adverbs, adjectives, conjunctions, and the like, within a sentence. In addition entity associations 325 may be used in conjunction with neural language model 321 or statistical parsing module 323 to identify a particular choice of words or speaking style in the context of a specific interaction. For instance, the character persona corresponding to Persona DB 322 may choose different words or adopt different speaking styles based on the ages, genders, or personality types of various entity associations 325, and those variations in expression may be utilized by NN based predictive model 320 to determine a generic expression or to generate a sentiment driven personified response for use by the character persona in interacting with a human user.

Thus, referring to FIG. 1, each of NN based predictive models 120 may be trained on structured data stored in one of persona specific conversational databases 122, where the structured data describes the vocabulary, phrases, and syntax rules that are idiosyncratic to a particular character personas, as well as one or more of a sentiment or a personality type of that character persona. However, the structured data stored in persona specific conversational databases 122 may be generated by system 100 from unstructured datasets including one or more of a movie script, a television script, and a video game script describing interactions by the respective one of the plurality of character personas.

Figure 4:
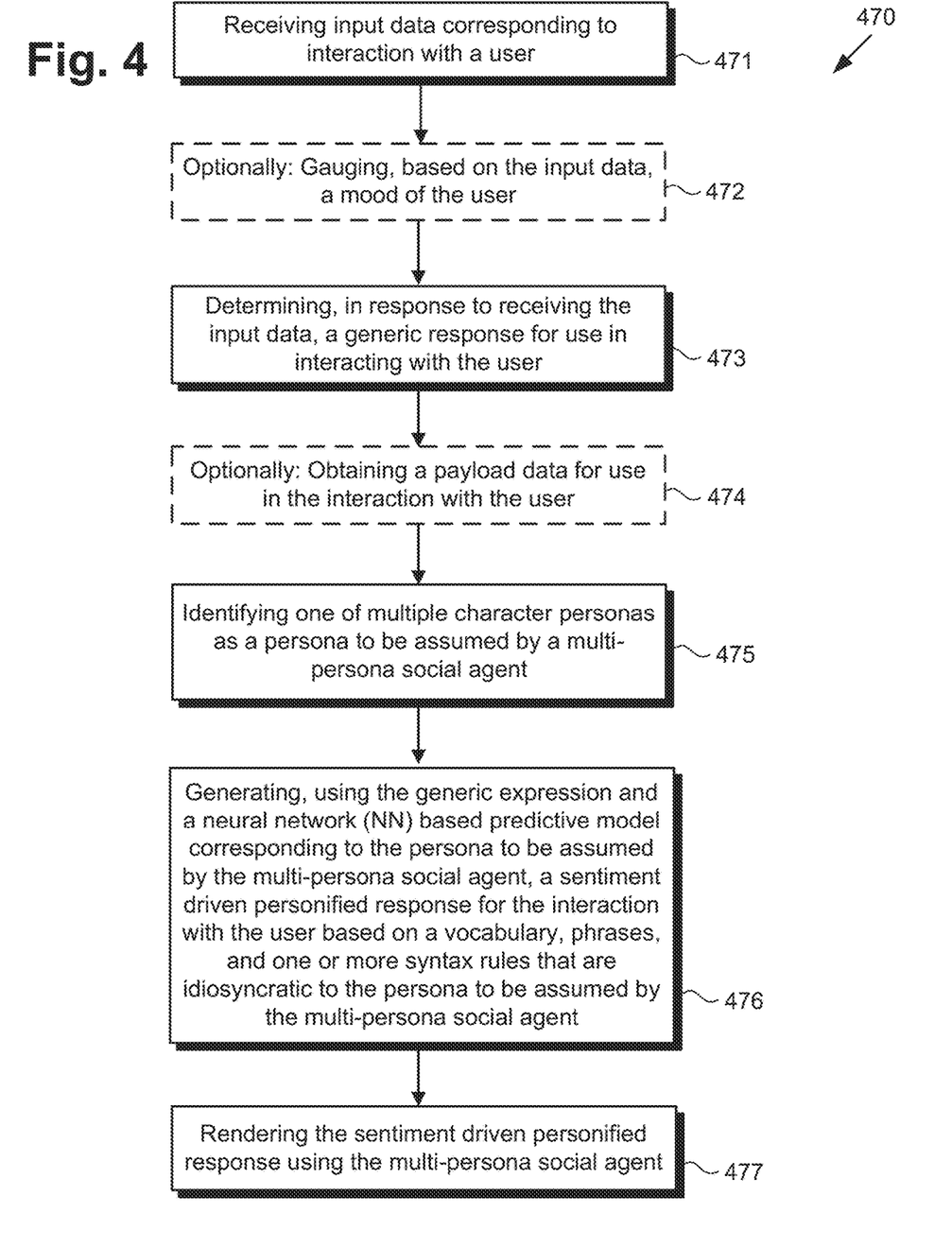
FIG. 4 shows a flowchart presenting an exemplary method for use by a system providing a multi-persona social agent, according to one implementation.

The performance of system 100, in FIG. 1, will be further described by reference to FIGS. 4 and 5. FIG. 4 presents flowchart 470 outlining an exemplary method for use by a system providing a multi-persona social agent, according to one implementation. With respect to the method outlined in FIG. 4, it is noted that certain details and features have been left out of flowchart 470 in order not to obscure the discussion of the inventive features in the present application.

Figure 5:
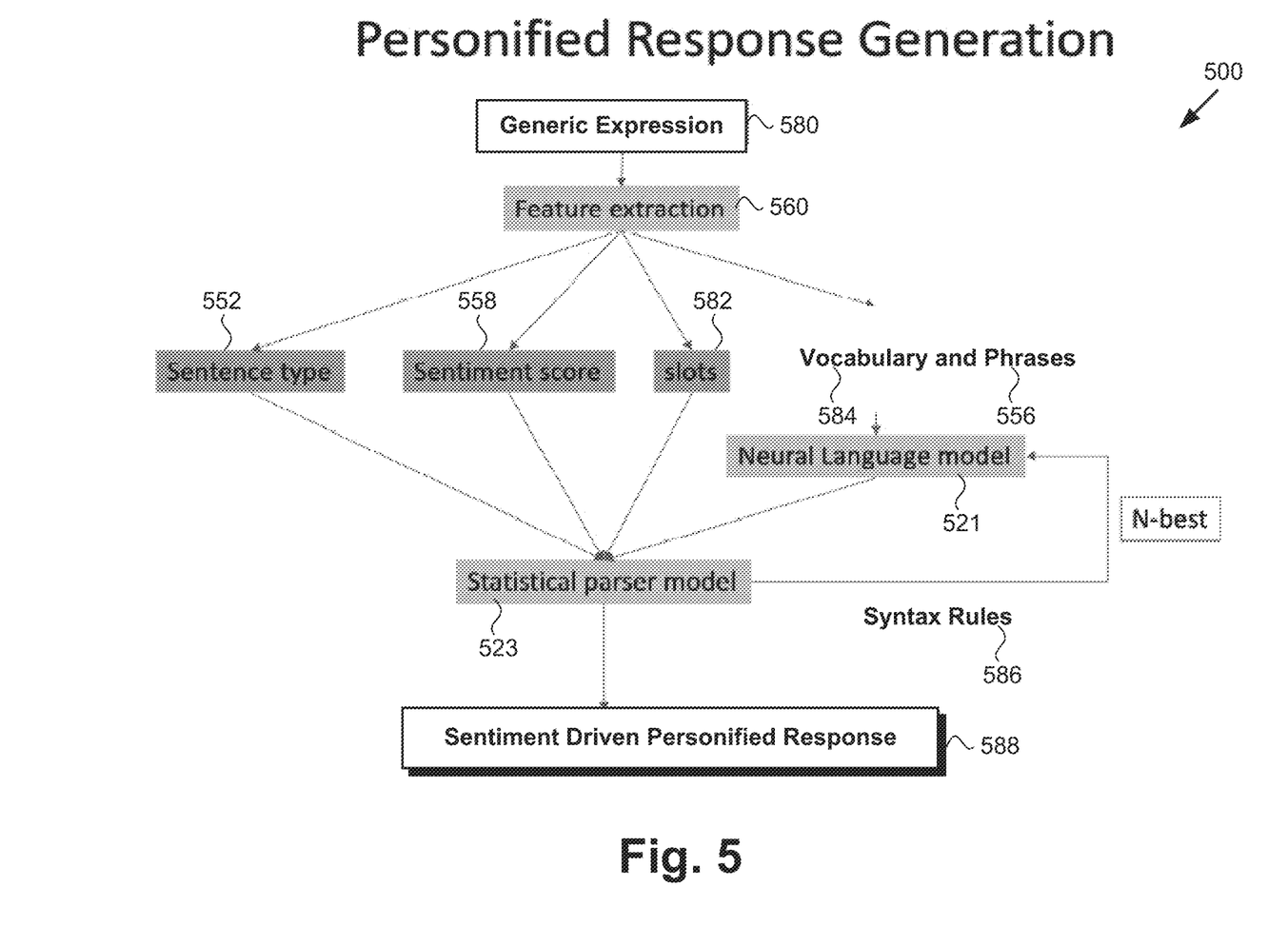
FIG. 5 is a diagram depicting generation of a sentiment driven personified response for use by a multi-persona social agent in interacting with a user, based on a generic expression responsive to an input by the user, according to one implementation.

FIG. 5 shows diagram 500 depicting generation of sentiment driven personified response 588 for use by a multi-persona social agent having assumed a specific character persona, in interacting with a user based on generic expression 580 responsive to input data received from the user, according to one implementation. As shown in FIG. 5, sentiment driven personified response 588 is generated based on generic expression 580 and utilizing feature extraction 560, sentence type 552, sentiment score 558, placeholder slots 582, vocabulary 584, phrases 556, neural language model 521, statistical parser model 523, and syntax rules 586 learned by statistical parser model 523.

It is noted that feature extraction 560 producing sentence type 552, phrases 556, and sentiment score 558 corresponds in general to NLP techniques 350 producing sentence type classification 352, phrases 356, and sentiment analysis 358, in FIG. 3. As a result, feature extraction 560, sentence type 552, phrases 556, and sentiment score 558 may share any of the characteristics attributed to NLP techniques 350, sentence type classification 352, phrases, 356, and sentiment analysis 358 by the present disclosure, and vice versa. In addition, neural language model 521 and statistical parser model 523, in FIG. 5, correspond respectively in general to neural language model 321 and statistical parser model 323, in FIG. 3, and those corresponding features may share any of the characteristics attributed to either corresponding feature by the present disclosure.

Referring to FIG. 4 in combination with FIGS. 1 and 2A, flowchart 470 begins with receiving input data 115 corresponding to an interaction with user 118 (action 471). Input data 115 may be received by software code 110, executed by hardware processor 104, via input module 130/230. Input data 115 may be received in the form of verbal and non-verbal expressions by user 118 in interacting with multi-persona social agent 116*a* or 116*b*, for example. As noted above, the term non-verbal expression may refer to vocalizations that are not language based, i.e., non-verbal vocalizations, as well as to physical gestures and physical postures. Examples of non-verbal vocalizations may include a sigh, a murmur of agreement or disagreement, or a giggle, to name a few. Alternatively, input data 115 may be received as speech uttered by user 118, or as one or more manual inputs to input device 132/232 in the form of a keyboard or touchscreen, for example, by user 118. Thus, input data 115 corresponding to the interaction with user 118 may correspond to one or more of speech by user 118, a non-verbal vocalization by user 118, a facial expression by user 118, a gesture by user 118, or a physical posture of user 118.

According to various implementations, system 100 advantageously includes input module 130/230, which may obtain video and perform motion capture, using camera(s) 234*e* for example, in addition to capturing audio using microphone(s) 236. As a result, input data 115 from user 118 may be conveyed to software code 110. Software code 110, when executed by hardware processor 104, may receive audio, video, and motion capture features from input module 130/230, and may detect a variety of verbal and non-verbal expressions by user 118 in an interaction by user 118 with system 100.

In some implementations, flowchart 470 optionally continues with gauging, based on input data 115, the mood or sentiment of user 118 (action 472). For example, based on a verbal expression, a non-verbal expression, or a combination of verbal and non-verbal expressions described by input data 115, software code 110, when executed by hardware processor 104, may be configured to gauge the mood, sentiment, or state-of-mind of user 118. For example, software code 110 may interpret input data 115 and gauge the mood of user 118 as one of happy, sad, angry, nervous, or distracted.

Referring to FIG. 5 with continued reference to FIGS. 1 and 4, Flowchart 470 continues with determining, in response to receiving input data 115, generic expression 580 for use in the interaction with user 118 (action 473). Generic expression 580 is determined by software code 110, executed by hardware processor 104, so as to be grammatically correct and responsively relevant to input data 115 received from user 118. That is to say, where input data 115 corresponds to a greeting by user 118, generic expression 580 may be a greeting in return. Alternatively, where input data 115 corresponds to an expression of confusion or uncertainty, generic response 580 may provide reassurance, advice, or an offer of assistance. Moreover, in implementations in which optional action 472 is performed, generic expression 580 for use in the interaction with user 118 may be determined, in part, based on the gauged mood of user 118.

Where input data 115 corresponds to a request for information by user 118, generic expression may include placeholder slots 582 to be filled with payload data 126 responsive to the user request. For example, where input data 115 corresponds to a request for movie recommendations based on specific criteria, such as a specific character or actor, placeholder slots 582 may be filled by payload data 126 identifying the relevant list of movies. It is noted that although flowchart 470 shows action 473 as following action 471 and optional action 472, that representation is merely exemplary. In some implementations, action 472 may be omitted, and actions 471 and 473 may be performed in parallel, i.e., substantially concurrently. Alternatively, in implementations in which action 472 is performed, any two or more of actions 471, 472, and 473 may be performed in parallel.

In some implementations in which generic expression 580 includes one or more placeholder slots 582, flowchart 470 may optionally continue with obtaining payload data 126 for use in the interaction with user 118 (action 474). Payload data 126 may be obtained by software code 110, executed by hardware processor 104. For example, as shown in FIG. 1, in some implementations, payload data 126 may be obtained from a remote database or knowledge base acting as payload data source 124, via communication network 112 and network communication links 114.

Flowchart 470 continues with identifying one of multiple character personas as a persona to be assumed by multi-persona social agent 116*a* or 116*b* (action 475). As noted above, each of NN based predictive models 120 and each of persona specific conversational databases 122 corresponds to a different respective one of multiple different character personas. Identification of the persona to be assumed by multi-persona social agent 116*a* or 116*b* may be performed by software code 110, executed by hardware processor 104, and may be based on one or more of a variety of different criteria. In one implementation, for example, identification of the persona to be assumed by multi-persona social agent 116*a* or 116*b* may be based on the location of multi-persona social agent 116*a* or 116*b* at the time of the interaction with user 118. Alternatively, or in addition, such identification may be responsive to a request included in input data 115 received from user 118. As another alternative, or in addition, identification of the persona to be assumed by multi-persona social agent 116*a* or 116*b* may be based on one or more of the number of users 118 included in the interaction, the day of the week or time of day of the interaction, weather conditions at the time of the interaction, or other events in the interaction environment that coincide with the interaction, to name a few examples.

It is noted that although flowchart 470 shows action 475 as following actions 471 and 473, as well as optional actions 472 and 474, that representation is merely exemplary. In other implementations, identification of the persona to be assumed by multi-persona social agent 116*a* or 116*b* may be predetermined, i.e., may precede action 471. In other implementations, action 475 may precede any or all of actions 472, 473, and 474, or may be performed in parallel, i.e., substantially concurrently, with one or more of actions 472, 473, and 474.

Flowchart 470 continues with generating, using generic expression 580 and the respective one of NN based predictive models 120 corresponding to the persona to be assumed by multi-persona social agent 116*a* or 116*b*, sentiment driven personified response 588 for the interaction with user 118, based on vocabulary 584, phrases 556, and at least one of syntax rules 586, all of which are idiosyncratic to the persona to be assumed by multi-persona social agent 116a or 116b (action 476). As discussed above, sentiment driven personified response 588 represents a transformation of generic expression 580 to the specific words, phrases, and sentence structures used by and idiosyncratic to the persona to be assumed by multi-persona social agent 116a or 116b.

Generation of sentiment driven personified response 588 may be performed in an iterative process, as indicated in the "N-best" loop shown in FIG. 5. Such a process may include selecting a word based on a sequence of words and adding the selected word to the sequence. That step may be repeated until the length of the sequence reaches a predetermined length, or until an end of a sentence is reached (either of which condition may serve as the end condition for the N-best loop).

In implementations in which payload data 126 is obtained in optional action 474, sentiment driven personified response 588 may interpret payload data 126 for user 118. For example, where payload data 126 identifies movies in response to an inquiry or request by user 118, sentiment driven personified response 588 may include a human readable list of recommended movies, or may include their description via audio output. Generation of sentiment driven personified response 588 in action 476 may be performed by software code 110, executed by hardware processor 104, and using one of NN based predictive models 120.

In some implementations, flowchart 470 can continue and conclude with rendering sentiment driven personified response 588 using multi-persona social agent 116a or 116b (action 477). As discussed above, sentiment driven personified response 588 may be generated by software code 110, executed by hardware processor 104, and using one of NN based predictive models 120. Sentiment driven personified response 588 is generated using the idiosyncratic communication traits specific to a character persona that may be one of a TV character persona, a movie character persona, a video game character persona, or a theme park character persona assumed by multi-persona social agent 116a or 116b, to name a few examples. Sentiment driven personified response 588 may be rendered using multi-persona social agent 116a or 116b by software code 110, executed by hardware processor 104.

In some implementations, sentiment driven personified response 588 may take the form of language based verbal communication by multi-persona social agent 116a or 116b. Moreover, in some implementations, output module 140/240 may include display 108/208. In those implementations, sentiment driven personified response 588 may be rendered as text on display 108/208. However, in other implementations sentiment driven personified response 588 may include a non-verbal communication by multi-persona social agent 116a or 116b, either instead of, or in addition to a language based communication. For example, in some implementations, output module 140/240 may include an audio output device, as well as display 108/208 showing an avatar or animated character as a representation of multi-persona social agent 116a. In those implementations, sentiment driven personified response 588 may be rendered as one or more of speech by the avatar or animated character, a non-verbal vocalization by the avatar of animated character, a facial expression by the avatar or animated character, a gesture by the avatar or animated character, or a physical posture adopted by the avatar or animated character.

Furthermore, and as shown in FIG. 1, in some implementations, system 100 may include multi-persona social agent 116b in the form of a robot or other machine capable of simulating expressive behavior and including output module 140/240. In those implementations, sentiment driven personified response 588 may be rendered as one or more of speech by multi-persona social agent 116b, a non-verbal vocalization by multi-persona social agent 116b, a facial expression by multi-persona social agent 116b, a gesture by multi-persona social agent 116b, or a physical posture adopted by multi-persona social agent 116b.

Figure 6:
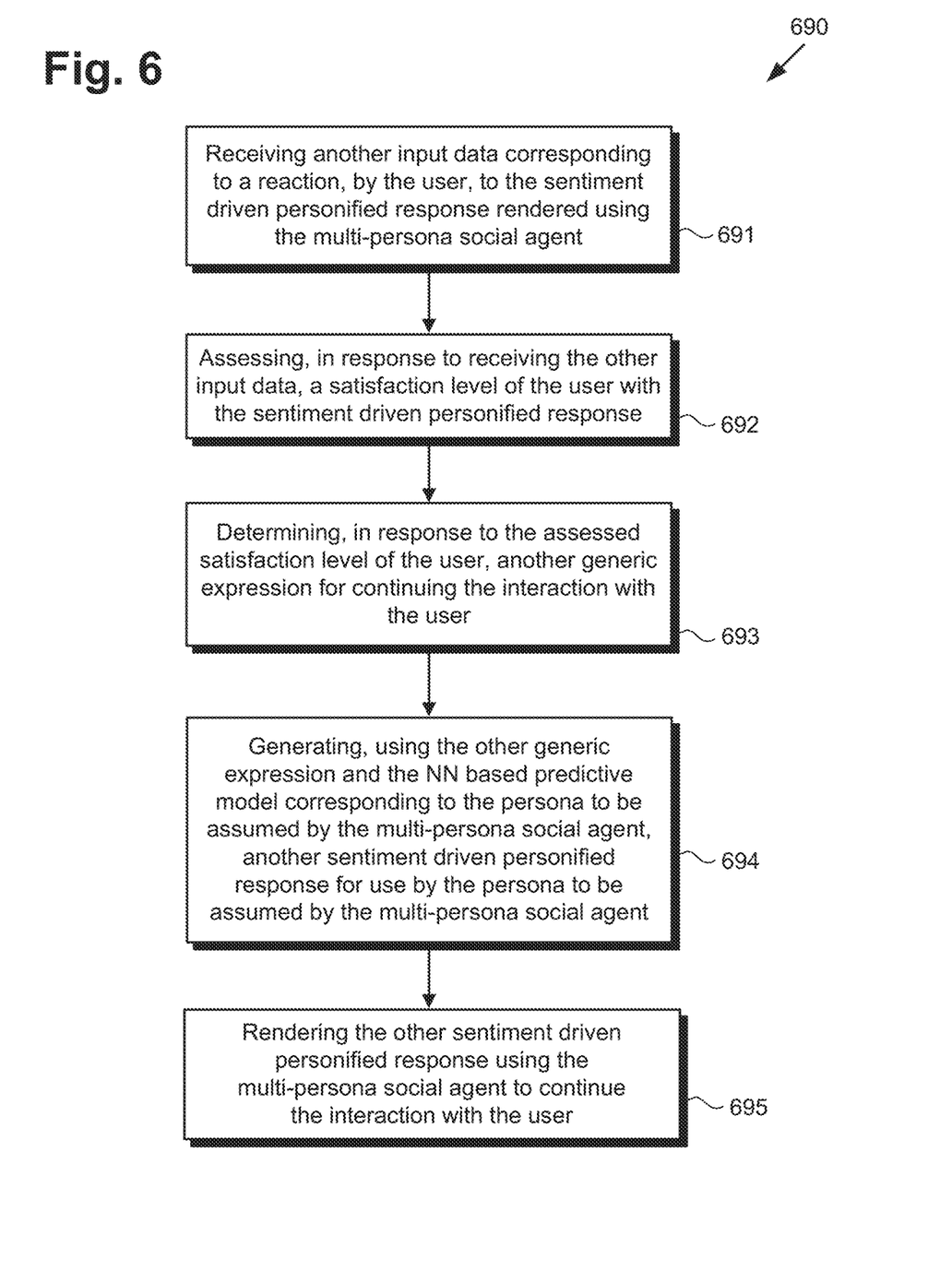
FIG. 6 shows a flowchart presenting actions for extending the method outlined in FIG. 4, according to one implementation.

FIG. 6 shows flowchart 690 presenting actions for extending the method outlined in FIG. 4, according to one implementation. With respect to the method outlined in FIG. 6, it is noted that certain details and features have been left out of flowchart 690 in order not to obscure the discussion of the inventive features in the present application.

Referring to FIGS. 1, 4, and 5 in conjunction with FIG. 6, flowchart 690 begins with receiving other input data 117 corresponding to a reaction, by user 118, to sentiment driven personified response 588 rendered using multi-persona social agent 116a or 116b (action 691). Action 691 may be performed by software code 110, executed by hardware processor 104, and in a manner analogous to that described above by reference to action 471.

Flowchart 690 continues with assessing, in response to receiving other input data 117, a satisfaction level of user 118 with sentiment driven personified response 588 (action 692). Action 692 may be performed by software code 110, executed by hardware processor 104, and in a manner analogous to that described above by reference to optional action 472.

Flowchart 690 continues with determining, in response to the assessed satisfaction level of user 118, another generic expression 580 for continuing the interaction with user 118 (action 693). Action 693 may be performed by software code 110, executed by hardware processor 104, and in a manner analogous to that described above by reference to action 473. It is noted that although flowchart 690 shows action 693 as following actions 691 and 692, that representation is merely exemplary. In some implementations, any two or more of actions 691, 692, and 693 may be performed in parallel, i.e., substantially concurrently.

Flowchart 690 continues with generating, using the generic expression determined in action 693 and the respective one of NN based predictive models 120 used in action 476, another sentiment driven personified response 588 for use by the persona to be assumed by multi-persona social agent 116a or 116b (action 694). Action 694 may be performed by software code 110, executed by hardware processor 104, and using one of NN based predictive models 120, in a manner analogous to that described above by reference to action 476.

Flowchart 690 can conclude with rendering the other sentiment driven personified response 588 using multi-persona social agent 116a or 116b to continue the interaction with user 118 (action 695). Action 695 may be performed by software code 110, executed by hardware processor 104, and in a manner analogous to that described above by reference to action 477.

It is emphasized that, in various implementations, actions 471, 473, and 475-477, or actions 471-473 and 475-477, or actions 471 and 473-477, or actions 471-477, as well as actions 691-695, may be performed in an automated process from which human involvement may be omitted.

Thus, the present application discloses automated systems and methods for providing a multi-persona social agent that address and overcome the deficiencies in the conventional art. The solutions disclosed in the present application advantageously enable the automated determination of naturalistic expressions for use by a multi-persona social agent in communicating with a user, based on learned speech characteristics of the particular character persona being assumed by the multi-persona social agent. The present solution improves on the conventional state-of-the-art by enabling the automated generation of sentiment driven personified responses from generic expressions, based on communication traits learned from unstructured datasets in the form of character scripts of interactions by a particular character persona. As a result, the present solution can provide highly varied responses based on the preferences and behaviors of a user interacting with the multi-persona social agent. Moreover, the present solution can advantageously include sentiment variations in the sentiment driven personified responses to adjust to user mood.

From the above description it is manifest that various techniques can be used for implementing the concepts described in the present application without departing from the scope of those concepts. Moreover, while the concepts have been described with specific reference to certain implementations, a person of ordinary skill in the art would recognize that changes can be made in form and detail without departing from the scope of those concepts. As such, the described implementations are to be considered in all respects as illustrative and not restrictive. It should also be understood that the present application is not limited to the particular implementations described herein, but many rearrangements, modifications, and substitutions are possible without departing from the scope of the present disclosure.

What is claimed is:

1. A system providing a multi-persona social agent, the system comprising:
   a computing platform including a hardware processor and a system memory;
   a software code stored in the system memory;
   a plurality of neural network (NN) based predictive models accessible by the software code, each of the plurality of NN based predictive models being trained to predict an interactive behavior of a respective one of a plurality of character personas;
   the hardware processor configured to execute the software code to:
      receive an input data corresponding to an interaction with a user;
      determine, in response to receiving the input data, a generic expression for use in the interaction with the user;
      identify, based on a location of the multi-persona social agent, one of the plurality of character personas as a persona to be assumed by the multi-persona social agent;
      generate, using the generic expression and a respective one of the plurality of NN based predictive models corresponding to the persona to be assumed by the multi-persona social agent, a sentiment driven personified response for the interaction with the user based on a vocabulary, a plurality of phrases, and at least one syntax rule that are idiosyncratic to the persona to be assumed by the multi-persona social agent; and
      render the sentiment driven personified response using the multi-persona social agent.

2. The system of claim 1, wherein each of the plurality of NN based predictive models is trained on a structured data stored in a persona specific conversational database of the respective one of the plurality of character personas, the structured data describing the vocabulary and the phrases that are idiosyncratic to the respective one of the plurality of character personas, and at least one of a sentiment or a personality type of the respective one of the plurality of character personas.

3. The system of claim 2, wherein the structured data stored in the persona specific conversational database is generated by the system from unstructured datasets comprising at least one of a movie script, a television script, and a video game script including interactions by the respective one of the plurality of character personas.

4. The system of claim 1, wherein the sentiment driven personified response comprises at least one of speech, text, a non-verbal vocalization, a facial expression, a physical posture, or a gesture.

5. The system of claim 1, wherein the generic expression includes at least one placeholder slot for a payload data, and wherein the hardware processor is further configured to execute the software code to:
   obtain the payload data; and
   wherein the sentiment driven personified response interprets the payload data for the user.

6. The system of claim 1, wherein the hardware processor is further configured to execute the software code to:
   gauge, based on the input data corresponding to the interaction with the user, a mood of the user; and
   wherein the generic expression for use in the interaction with the user is generated, in part, on the gauged mood of the user.

7. A method for use by a system providing a multi-persona social agent, the system including a computing platform having a hardware processor, a system memory storing a software code, and a plurality of neural network (NN) based predictive models accessible by the software code, each of the plurality of NN based predictive models being trained to predict an interactive behavior of a respective one of a plurality of character personas, the method comprising:
   receiving, by the software code executed by the hardware processor, an input data corresponding to an interaction with a user;
   determining, by the software code executed by the hardware processor in response to receiving the input data, a generic expression for use in the interaction with the user;
   identifying, by the software code executed by the hardware processor, based on a location of the multi-persona social agent, one of the plurality of character personas as a persona to be assumed by the multi-persona social agent;
   generating, by the software code executed by the hardware processor and using the generic expression and a respective one of the plurality of NN based predictive models corresponding to the persona to be assumed by the multi-persona social agent, a sentiment driven personified response for the interaction with the user based on a vocabulary, a plurality of phrases, and at least one syntax rule that are idiosyncratic to the persona to be assumed by the multi-persona social agent; and
   rendering, by the software code executed by the hardware processor, the sentiment driven personified response using the multi-persona social agent.

8. The method of claim 7, wherein each of the plurality of NN based predictive models is trained on a structured data stored in a persona specific conversational database of the respective one of the plurality of character personas, the structured data describing the vocabulary and the phrases that are idiosyncratic to the respective one of the plurality of character personas, and at least one of a sentiment or a personality type of the respective one of the plurality of character personas.

9. The method of claim 8, wherein the structured data stored in the persona specific conversational database is generated by the system from unstructured datasets comprising at least one of a movie script, a television script, and a video game script including interactions by the respective one of the plurality of character personas.

10. The method of claim 7, wherein the sentiment driven personified response comprises at least one of speech text, a non-verbal vocalization, a facial expression, a physical posture, or a gesture.

11. The method of claim 7, wherein the generic expression includes at least one placeholder slot for a payload data, the method further comprising:
obtaining, by the software code executed by the hardware processor, the payload data; and
wherein the sentiment driven personified response interprets the payload data for the user.

12. The method of claim 7, further comprising:
gauging, by the software code executed by the hardware processor and based on the input data corresponding to the interaction with the user, a mood of the user; and
wherein the generic expression for use in the interaction with the user is generated, in part, on the gauged mood of the user.

13. The system of claim 1, wherein the multi-persona social agent is a robot.

14. The system of claim 1, wherein the hardware processor is further configured to execute the software code to:
receive another input data corresponding to another interaction with another user;
determine, in response to receiving the another input data, the same generic expression for use in the another interaction with the another user;
identify another one of the plurality of character personas as the persona to be assumed by the multi-persona social agent;
generate, using the same generic expression and another respective one of the plurality of NN based predictive models corresponding to the another one of the plurality of character personas to be assumed by the multi-persona social agent, another sentiment driven personified response for the another interaction with the another user based on another vocabulary, another plurality of phrases, and at least another syntax rule that are idiosyncratic to the another one of the plurality of character personas to be assumed by the multi-persona social agent; and
render the another sentiment driven personified response using the multi-persona social agent.

15. The method of claim 7, wherein the multi-persona social agent is a robot.

16. The method of claim 7, further comprising:
receiving, by the software code executed by the hardware processor, another input data corresponding to another interaction with another user;
determining, by the software code executed by the hardware processor in response to receiving the another input data, the same generic expression for use in the another interaction with the another user;
identifying, by the software code executed by the hardware processor, another one of the plurality of character personas as the persona to be assumed by the multi-persona social agent;
generating, by the software code executed by the hardware processor and using the same generic expression and another respective one of the plurality of NN based predictive models corresponding to the another one of the plurality of character personas to be assumed by the multi-persona social agent, another sentiment driven personified response for the another interaction with the another user based on another vocabulary, another plurality of phrases, and at least another syntax rule that are idiosyncratic to the another one of the plurality of character personas to be assumed by the multi-persona social agent; and
rendering, by the software code executed by the hardware processor, the another sentiment driven personified response using the multi-persona social agent.

17. A multi-persona robot comprising:
a computing platform including a hardware processor and a system memory;
a software code stored in the system memory;
a plurality of neural network (NN) based predictive models accessible by the software code, each of the plurality of NN based predictive models being trained to predict an interactive behavior of a respective one of a plurality of character personas;
the hardware processor configured to execute the software code to:
receive an input data corresponding to an interaction with a user;
determine, in response to receiving the input data, a generic expression for use in the interaction with the user;
identify, based on a location of the robot, one of the plurality of character personas as a persona to be assumed by the multi-persona robot;
generate, using the generic expression and a respective one of the plurality of NN based predictive models corresponding to the persona to be assumed by the multi-persona robot, a sentiment driven personified response for the interaction with the user based on a vocabulary, a plurality of phrases, and at least one syntax rule that are idiosyncratic to the persona to be assumed by the multi-persona robot; and
render the sentiment driven personified response to the user.

* * * * *